(No Model.)

M. WOODHULL.
VEHICLE GEAR.

No. 371,293. Patented Oct. 11, 1887.

Witnesses:
W. G. Jirdinston.
Charles Billon,

Inventor:
Morris Woodhull
by Peck & Rector
his Attorneys.

UNITED STATES PATENT OFFICE.

MORRIS WOODHULL, OF DAYTON, OHIO.

VEHICLE-GEAR.

SPECIFICATION forming part of Letters Patent No. 371,293, dated October 11, 1887.

Application filed June 17, 1887. Serial No. 241,631. (No model.)

*To all whom it may concern:*

Be it known that I, MORRIS WOODHULL, a citizen of the United States, residing at Dayton, in the county of Montgomery and State of Ohio, have invented certain new and useful Improvements in Vehicle-Gears, of which the following is a full, clear, and exact description, reference being had to the accompanying drawings, forming part of this specification.

My invention relates to that class of gears which employ side bars; and it consists, primarily, in the interposition between the side bars and rear axle of cushioning-springs, in the manner and for the purpose hereinafter more fully set forth.

Figure 1:
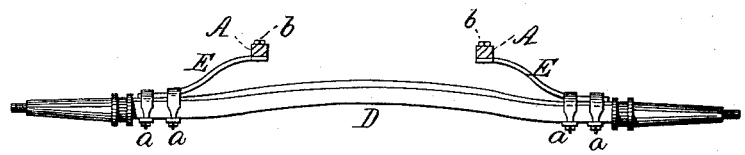
Figure 2:
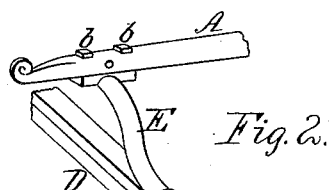
Figure 3:
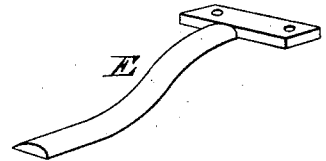
Figure 4:
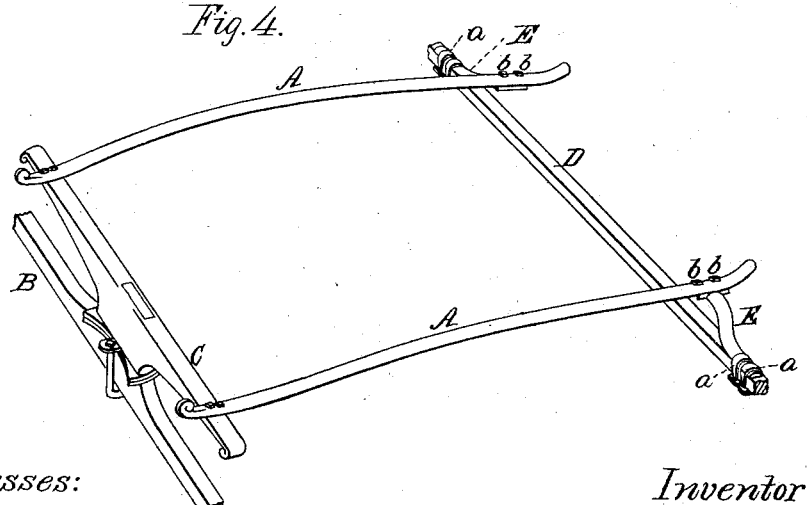

In the accompanying drawings, Figure 1 is a front elevation of the rear axle, showing the application of the cushioning-springs. Fig. 2 is an enlarged detail of the same in perspective. Fig. 3 is an enlarged perspective view of one of the cushioning-springs detached. Fig. 4 is a perspective view of so much of a gear as is necessary to show the application of my invention.

The same letters of reference are used to indicate identical parts in all the figures.

It has been the custom heretofore in the construction of side-bar gears either to connect the rear ends of the side bars to the axle directly or through the interposition of a bolster, or else to rest them upon the ends of a spring secured to the rear axle at its middle. The former of these methods of construction is objectionable for the reason that too great rigidity is given to the parts, and the latter method is not satisfactory for the reason that too much elasticity is given, but more particularly because the entire weight carried is thrown upon the center of the axle, and, furthermore, because the length of the spring causes the body and side bars to sag on either side when unequally loaded.

My invention, designed to overcome both of these objections, will be readily understood by reference to the accompanying drawings, where A A represent the side bars; B, the front axle, to which the side bars are connected by the usual bolster, C, and D the rear axle.

E E are two steel cushioning-springs, whose outer ends are secured, in this instance, by clips *a* to the rear axle close to the spindles, and which, extending inward and upward, have their inner ends secured to the side bars near their rear ends. In the drawings I have shown the inner ends of the springs flattened and T-shaped and their attachment to the side bars effected by countersunk bolts *b;* but it is apparent that any other suitable method of attachment may be employed.

Where the axle is entirely of metal, the springs E E may be secured thereto by bolts or rivets; but where it is partially of wood, as shown in the drawings, I prefer to use clips. These springs are made of great rigidity, and are not intended to take the place of the body-springs, but merely to act as cushioning-springs to receive the shocks and jars to which the vehicle may be subjected. By extending them inward from the outer ends of the axle the weight of the load is thrown upon that part of the axle near the wheels and best able to bear it, and the sagging of the body and side bars to one side under an unequal load is prevented.

While I have illustrated my invention as applied to the ordinary separate side bars, it is applicable to side bars generally, whether they be formed of one continuous piece of wood or metal or otherwise.

Having thus fully described my invention, I claim—

1. In a side-bar vehicle gear, the combination, with the side bars and rear axle, of interposed cushioning-springs secured to the side bars near their rear ends and extending outward and connected to the axle near its ends, substantially as described.

2. The combination, with the side bars, A A, and rear axle, D, of the cushioning-springs E E, interposed between the rear ends of the side bars and the outer ends of the rear axle, in the manner and for the purpose specified.

3. The cushioning-spring E, for side-bar-vehicle gears, constructed and arranged to be interposed between the rear ends of the side bars and the rear axle and extend outward from the side bars to the axle near its ends, substantially as described.

MORRIS WOODHULL.

Witnesses:
E. W. RECTOR,
CHARLES BILLON.